(12) United States Patent
Naphade et al.

(10) Patent No.: US 10,131,856 B2
(45) Date of Patent: Nov. 20, 2018

(54) GASIFICATION QUENCH SYSTEM

(71) Applicant: General Electric Company, Schenectady, NY (US)

(72) Inventors: Pravin Sadashiv Naphade, Bangaluru (IN); Muralidharan Lakshmipathy, Bangaluru (IN); Atul Kumar Vij, Bangalore (IN)

(73) Assignee: General Electric Company, Schenectady, NY (US)

( * ) Notice: Subject to any disclaimer, the term of this patent is extended or adjusted under 35 U.S.C. 154(b) by 112 days.

(21) Appl. No.: 15/429,092

(22) Filed: Feb. 9, 2017

(65) Prior Publication Data
US 2018/0223199 A1    Aug. 9, 2018

(51) Int. Cl.
*C10J 3/82* (2006.01)
*F28C 3/06* (2006.01)
*F28F 9/22* (2006.01)

(52) U.S. Cl.
CPC ............ *C10J 3/82* (2013.01); *F28C 3/06* (2013.01); *F28F 9/22* (2013.01); *C10J 2300/1603* (2013.01); *F28F 2009/224* (2013.01); *F28F 2009/228* (2013.01)

(58) Field of Classification Search
CPC .......... C10J 3/84; B01D 45/08; B01D 47/021; B01D 50/004; F28C 3/06
See application file for complete search history.

(56) References Cited

U.S. PATENT DOCUMENTS

| | | | | |
|---|---|---|---|---|
| 2,818,326 A | * | 12/1957 | Eastman | C01B 3/32 261/121.1 |
| 4,005,999 A | * | 2/1977 | Carlson | B01D 47/024 261/119.1 |
| 4,239,515 A | * | 12/1980 | Yanagioka | B01D 53/504 261/122.1 |
| 4,494,963 A | * | 1/1985 | Reich | C10J 3/485 48/69 |
| 4,581,899 A | * | 4/1986 | von Klock | C10J 3/485 261/112.1 |
| 4,605,423 A | * | 8/1986 | Koog | C10J 3/485 48/69 |
| 4,778,483 A | * | 10/1988 | Martin | B01D 47/024 48/69 |
| 4,828,578 A | * | 5/1989 | Den Bleyker | B01J 19/0013 48/69 |
| 6,113,739 A | * | 9/2000 | Nilsson | D21C 11/06 162/30.1 |
| 6,238,468 B1 | * | 5/2001 | Nilsson | D21C 11/04 95/226 |
| 8,673,036 B2 | * | 3/2014 | Tiwari | C10J 3/84 261/110 |
| 9,404,054 B2 | * | 8/2016 | Karmakar | C10K 1/046 |

(Continued)

*Primary Examiner* — Matthew J Merkling
(74) *Attorney, Agent, or Firm* — Fletcher Yoder, P.C.

(57) ABSTRACT

A system including a quench system that may cool a syngas generated in a gasification chamber. The quench system includes a quench chamber, a dip tube that may direct the syngas from the gasification chamber into a quench liquid to cool the syngas to generate a cooled syngas, and a draft tube disposed circumferentially about the dip tube and that may receive the cooled syngas. A passage is disposed between a first wall of the dip tube and a second wall of the draft tube, and the draft tube includes a tapered configuration in a flow direction along the passage.

19 Claims, 6 Drawing Sheets

(56) References Cited

U.S. PATENT DOCUMENTS

| | | | | |
|---|---|---|---|---|
| 2010/0140817 A1* | 6/2010 | Harteveld | ................ | C10J 3/485 261/112.1 |
| 2010/0325956 A1* | 12/2010 | Dinu | ........................ | C10J 3/485 48/85 |
| 2010/0325957 A1* | 12/2010 | Klockow | ................... | C10J 3/84 48/87 |
| 2011/0067304 A1* | 3/2011 | Klockow | ............ | B01D 47/021 48/87 |
| 2011/0120009 A1* | 5/2011 | Klockow | ............ | B01D 47/021 48/87 |

* cited by examiner

GASIFICATION QUENCH SYSTEM

BACKGROUND

The subject matter disclosed herein relates to gasification systems and, more particularly, to quench system configurations for separating entrained quench liquid from syngas.

Fossil fuels, such as solid coal, liquid petroleum, or biomass, may be gasified for use in the production of electricity, chemicals, synthetic fuels, or for a variety of other applications. Gasification involves reacting a carbonaceous fuel and oxygen at a very high temperature to produce synthesis gas, commonly referred to as syngas, which is a fuel containing carbon monoxide and hydrogen. Syngas combusts more efficiently and cleaner than the fuel in its original state before gasification. In addition to the syngas, gasification may also generate several by-products such as carbon dioxide, hydrogen sulfide, ammonia, slag, fine particles of ash, and unconverted carbon. Accordingly, prior to use, the syngas may be cooled and further processed to separate the by-products from the syngas.

BRIEF DESCRIPTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system including a quench system that may cool a syngas generated in a gasification chamber. The quench system includes a quench chamber, a dip tube that may direct the syngas from the gasification chamber into a quench liquid to cool the syngas to generate a cooled syngas, and a draft tube disposed circumferentially about the dip tube and that may receive the cooled syngas. A passage is disposed between a first wall of the dip tube and a second wall of the draft tube, and the draft tube includes a tapered configuration in a flow direction along the passage.

In a second embodiment, a system includes a draft tube that may be mounted about a dip tube in a quench system of a gasifier downstream from a gasification chamber. The draft tube includes at least one radially oriented opening and a tapered configuration.

In a third embodiment, a method includes routing a syngas from a gasification chamber, through a dip tube, and into a quench liquid to cool the syngas to generate a cooled syngas; and routing the cooled syngas through a passage between the dip tube and a draft tube disposed circumferentially about the dip tube. The draft tube includes a tapered configuration in a flow direction along the passage.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed in detail below, the disclosed embodiments include a gasification system including a quench chamber designed to remove entrained moisture (e.g., water) from a syngas generated in a gasification system. Generally, during gasification, a fuel source or feedstock undergoes partial oxidation in a gasifier to produce a syngas. The resultant syngas exits the gasifier and enters the quench chamber at a high temperature and a high pressure. Accordingly, the syngas may be cooled to a desired temperature. Cooling of the syngas may also facilitate removal of gasification by-products that may be mixed with the syngas exiting the gasifier. The quench chamber may use a quench liquid (e.g., water) to cool the syngas, which may increase a moisture content of the syngas. For example, the syngas may impinge on a pool of quench liquid within the quench chamber and draw a substantial amount of the quench liquid into the flow of the syngas. A portion of the quench liquid may be entrained in the syngas producing a two-phase gas-liquid flow due, in part, to drag forces acting on the quench liquid by the syngas as a result of a flow velocity of the syngas. The temperature of the syngas may cause evaporation of at least a portion of the quench liquid, thereby increasing levels of water vapor entering the syngas. Accordingly, the quench chamber may include a draft tube that facilitates entrainment of the quench liquid and cooling of the syngas.

In addition, the draft tube may include one or more features that facilitates removal of the entrained quench liquid from the cooled syngas before the syngas is directed to downstream process (e.g., a syngas treatment, power production, etc.). For example, the draft tube may include certain features that may decrease a flow velocity of the cooled syngas and, consequently, decrease the drag forces acting on the entrained quench liquid by the syngas. The decrease in the drag forces acting on the entrained quench liquid may allow the entrained quench liquid to separate from the cooled syngas, thereby generating a quenched syngas having substantially less moisture compared to the cooled syngas.

The quench chamber includes a dip tube upstream of the draft tube that directs the hot syngas toward a pool of the quench liquid used to cool the syngas. As the hot syngas impinges on the pool of the quench liquid, the flow velocity of the syngas applies the drag forces on at least a portion of the quench liquid, causing entrainment of the quench liquid with the syngas (e.g., a two-phase gas-liquid flow). Therefore, after impinging on the pool of the quench liquid, the two-phase gas-liquid syngas flows into the draft tube. The configuration of the draft tube allows both entrainment of the quench liquid in the syngas to cool the syngas (e.g., at an upstream end of the draft tube), and facilitates removal of the entrained quench liquid from the cooled syngas (e.g., at a downstream end of the draft tube). The draft tube is positioned circumferentially around the dip tube such that a partially cooled syngas having the entrained quench liquid flows into the draft tube in a flow direction (e.g., upward direction) that is substantially opposite a flow direction (e.g., downward direction) of the syngas flowing through the dip tube. For example, after exiting the dip tube, the partially cooled syngas (e.g., two-phase gas-liquid flow) flows into a contact zone of the draft tube in an upward direction and toward a syngas outlet. The contact zone of the draft tube allows for maximum contact between the syngas and the quench liquid, resulting in a desirable amount of the quench liquid to be entrained in the syngas and facilitate cooling of the syngas. Moreover, the flow direction reversal of the cooled syngas from the downward direction (e.g., in the dip tube) to the upward direction (e.g., in the draft tube) may also enable entrainment of the quench liquid at the upstream end of the draft tube to cool the syngas due to the drag forces acting on the quench liquid by the syngas.

The draft tube may also include a separation zone having features that enable separation of the entrained quench liquid from the cooled syngas by, for example, decreasing the drag forces acting on the quench liquid at the downstream end of the draft tube. For example, due, in part, to reversing the flow of the cooled syngas in the draft tube relative to the downward flow of the hot syngas through the dip tube a flow velocity of the cooled syngas may decrease, which may also decrease the drag forces acting on the entrained quench liquid due to the upward flow direction of the cooled syngas. The cooled syngas may be unable to carry droplets of the entrained quench liquid as a result of the decreased flow velocity. Additionally, the decreased flow velocity of the cooled syngas may increase an amount of time the cooled syngas is within the draft tube before exiting through the syngas outlet, which may also facilitate removal of the entrained quench liquid. Without the disclosed embodiment, separation of the entrained quench liquid may not be achieved until after then cooled syngas exits the draft tube.

Accordingly, the cooled syngas (e.g., two-phase liquid-gas flow) may not be within the quench chamber for a sufficient amount of time to allow the entrained quench liquid to be removed before the cooled syngas exits the syngas outlet. Therefore, it may be desirable to increase a flow area of the draft tube (e.g., a flow area of the separation zone of the draft tube) to further decrease the flow velocity of the cooled syngas as it flows in the upward direction through the draft tube. The draft tube may also include impinging trays (e.g., shear plates) that may also decrease a flow velocity of the cooled syngas and facilitate removal of the entrained quench liquid from the cooled syngas through one or more drainage openings along a wall of the draft tube. Accordingly, provided herein is a quench chamber that includes a draft tube having a configuration that increases the flow area of the cooled syngas and decreases the drag forces acting on the entrained quench liquid to allow efficient removal of the quench liquid entrained in the cooled syngas through one or more drainage openings positioned along the wall of the draft tube.

Figure 1:
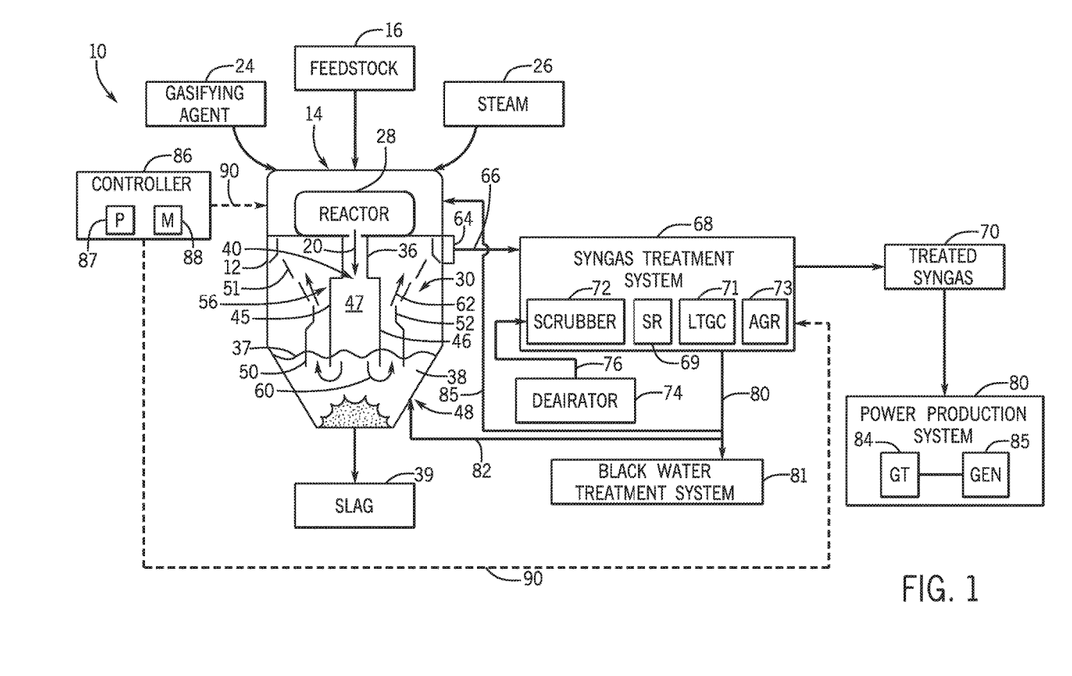
FIG. 1 is a block diagram of an embodiment of a gasification system including a gasification vessel having a draft tube positioned in a quench chamber, whereby the draft tube includes a tapered configuration.

FIG. 1 is a schematic diagram of an embodiment of a gasification system 10 configured to separate a cooling fluid (e.g., quench liquid) from syngas generated in the gasification system 10. As shown in FIG. 1, the gasification system 10 may include a gasification vessel 12 having a gasifier 14 (e.g., reactor) configured to gasify a feedstock 16 (e.g., fuel) to generate an untreated syngas 20. The feedstock 16 may include coal, petroleum coke, coal and coke blends, biomass, wood-based materials, agricultural wastes, tars, asphalt, gas oil, coke oven gas, fuel gas, natural gas or other carbon containing materials. The feedstock 16 may be resized or reshaped, for example, by chopping, milling, shredding, pulverizing, briquetting, or pelletizing the feedstock 16 prior to entering the gasifier 14. Additionally, the feedstock 16 may include additives, such as water, to create a fuel slurry. However, in other embodiments, the feedstock 16 may enter the gasifier 14 as a dry feedstock. The gasifier 14 may be part of an integrated gasification combined cycle (IGCC) power plant or any other variety of plants that use or produce a syngas. The gasifier 14 may be an updraft or downdraft fixed-bed gasifier, a fluidized-bed gasifier, such as a bubbling fluidized-bed gasifier or a circulating fluidized-bed gasifier, moving bed gasifier, or an entrained flow gasifier.

While in the gasifier 14, the feedstock 16 may be mixed with a gasifying agent 24 (e.g., oxidant, such as, oxygen, oxygen-rich air, or oxygen-reduced air) and steam 26 in a reactor 28 (e.g., reaction chamber or gasification chamber) disposed within the gasifier 14 to produce the untreated syngas 20. In particular, the feedstock 16 may be reacted with a limited amount of the gasifying agent 24 at elevated pressures (e.g., from absolute pressures of approximately 20 bar to 85 bar) and temperatures (e.g., approximately 700° C. to 1600° C.) to partially oxidize the feedstock 16 and generate the untreated syngas 20. Due to chemical reactions between the gasifying agent 24, steam 26, and carbon within the feedstock 16, the untreated syngas 20 may include hydrogen, carbon monoxide, water, carbon dioxide, hydrogen sulfide, methane, and ammonia, as well as other components, such as ash, sulfur, nitrogen, and chloride, present in the carbonaceous fuel. In addition, the untreated syngas 20 may include unconverted carbon (e.g., feedstock that did not participate in gasification reactions).

The gasifier 14 may also include a quench chamber 30 downstream of the reactor 28. In certain embodiments, the quench chamber 30 may be integral with the gasifier 14. In other embodiments, the quench chamber 30 may be a separate unit from the gasifier 14. The quench chamber 30 may cool and separate the untreated syngas 20 from gasification by-products (e.g., molten slag.). Within the reactor 28, the feedstock 16 may be heated to undergo various conversion processes, including pyrolysis and partial oxidation. According to certain embodiments, depending on the feedstock 16 utilized, pyrolysis may occur at temperatures inside the reactor 28 ranging from approximately 150° C. to 700° C., and partial oxidation may occur at temperatures ranging from approximately 1100° C. to 1500° C. These processes may generate a solid, e.g., char, and residue, a liquid, e.g., molten slag, and gases, e.g., carbon monoxide, hydrogen, water, and methane. The quench chamber 30 of the gasifier 14 may receive the untreated syngas 20 and the gasification by-products, as indicated by arrow 20, as they leave the reactor 28 through a bottom end 36 (or throat) of the reactor 28. In general, the quench chamber 30 may be used to quench and thereby reduce the temperature of the untreated syngas 20 and gasification byproducts, and to disengage a portion of the gasification by-products (e.g., molten slag) from the untreated syngas 20. In certain embodiments, a quench liquid 38 (e.g., water) may flow through the bottom end 36 and fill the quench chamber 30 to facilitate cooling of the untreated syngas 20 and gasification by-products (e.g., molten slag). For example, as the untreated syngas 20 and gasification by-products flow through the bottom end 36 (e.g., arrow 20), at least a portion of the quench liquid 38 within the quench chamber 30 may be heated and/or vaporized by extracting heat from the untreated syngas 20 and molten slag, resulting in cooling of the untreated syngas 20 and the cooling and freezing of the molten slag to form solid slag 39. In certain embodiments, the quench chamber 30 may include a quench ring (e.g., quench ring 118, FIG. 2) at the bottom end 36 (e.g., at an entrance 40 of the quench chamber 30) configured to receive and provide the quench liquid 38 to the quench chamber 30. The quenched or frozen slag 39 may accumulate in the bottom of the quench bath 48, after which the slag 39 may be removed and directed to downstream processing systems configured to dispose of the slag 39.

The quench system 30 also includes a dip tube 46 (e.g., annular dip tube) extending from the bottom end 36 of the reactor 28 toward a bottom of the quench bath 48 of the quench chamber 30 that conducts the hot untreated syngas 20 and gasification byproducts into the quench liquid 38. The dip tube 46 may take any form suitable for facilitating cooling of the untreated syngas 20 and/or for directing the untreated syngas 20 toward the bottom of quench bath 48. For example, the dip tube 46 (e.g., annular dip tube) may have a wall 45 (e.g., annular wall) extending circumferentially about an interior chamber or passage 47. In certain embodiments, a lower end 50 of the dip tube 46 may extend into the quench liquid 38 below a surface level 37 of the quench liquid 38. Accordingly, the dip tube 46 may route the untreated syngas 20 through an interior 47 (e.g., passage or chamber) toward the quench liquid 38, such that the untreated syngas 20 impinges on and flows through (e.g., bubbles through) the quench liquid 38 around the lower end 50 of the dip tube 46 as indicated by arrow 60. The quench liquid 38 cools the untreated syngas 20 and becomes at least partially entrained in the untreated syngas 20, thereby producing a cooled syngas 20 with entrained quench liquid 38 (e.g., two-phase liquid-gas flow).

The quench chamber 30 also includes a draft tube 52 disposed about (e.g., coaxial with) the dip tube 46 and configured to enhance the contact between the untreated syngas 20 and quench liquid 38. For example, the draft tube 52 (e.g., annular draft tube) may have a wall 51 (e.g., annular wall) extending circumferentially about the wall 45 of the dip tube 46, thereby defining an intermediate chamber or passage (e.g., annular passage or annulus 56). As discussed in detail below, the draft tube 52 includes a contact zone that allows for a desirable amount of contact between the untreated syngas 20 and the quench liquid 38 to enable entrainment of the quench liquid 38 in the untreated syngas 20. The draft tube 52 also includes a separation zone having features that allow separation of the entrained quench liquid 38 from cooled syngas.

In operation, the syngas 20 flows through the dip tube in the downward direction from the bottom end 36 of the reactor 28 toward the quench bath 48. The untreated syngas 20 impinges on the quench liquid 38 in the quench bath 48 and exits the dip tube 46 through the quench bath 48. For example, the untreated syngas 20 bubbles through the quench liquid 36 and flows into a contact zone 59 of the draft tube 52 away from the quench liquid 38 upwardly through the annulus 56 between the dip tube 46 and the draft tube 52, as shown by arrows 60 and 62. The contact zone 59 of the draft tube 52 is configured to allow sufficient contact between the untreated syngas 20 and the quench liquid 38, resulting in a desirable amount of entrained quench liquid 38 in the flow of the untreated syngas 20, thereby producing cooled syngas 62. The cooled syngas 62 flows through the draft tube 52 in a direction that is substantially opposite a direction of the untreated syngas 20 flowing through the dip tube 46.

Following the contact zone 59 of the draft tube 52, the cooled syngas 62 flows into a separation zone 61 of the draft tube 52. The separation zone 61 may include features that facilitate removal of the entrained quench liquid 38 from the untreated syngas 20. Additionally, the directional change in the flow of the cooled syngas 62 may facilitate separation of the entrained quench liquid 38 from the cooled syngas 62 in the separation zone 61 by, for example, gravitational forces. For example, as the cooled syngas 62 flows upward through the annulus 56, the cooled syngas 62 may be unable to carry the entrained quench liquid 38 due to a decrease in the flow velocity of the cooled syngas 62 resulting from the directional change in the flow of the cooled syngas 62 upwardly through the draft tube 52. In certain embodiments, the separation zone 61 of the draft tube 52 may include features that may further facilitate removal of the entrained quench liquid 38 from the cooled syngas 62. For example, as discussed in further detail below, the separation zone 61 (e.g., downstream portion) of the draft tube 52 may have a tapered or diverging configuration of the wall 51 (e.g., an increasing diameter in the flow direction of the cooled syngas 62 through the draft tube 52) and/or a plurality of shear plates (e.g., impinging plates) that may decrease a flow velocity of the cooled syngas 62 and, consequently, the drag forces acting on the entrained quench liquid by the cooled syngas 62 as the cooled syngas 62 flows through the annulus 56 of the draft tube 52. As discussed in further detail below, with reference to FIG. 3, the draft tube may include one or more radial openings (e.g., radial drainage openings) that allow drainage of the entrained quench liquid 38 separated from the untreated syngas 20 into the quench bath 48. In this way, the draft tube 52 removes the entrained quench liquid 38 from the cooled syngas 62 to generate a second cooled syngas 66 with a reduced content of the entrained quench liquid 38 (e.g., with a moisture content of less than approximately 5, 10, 15, 20, or 25 percent). For example, the second cooled syngas 66 may have less entrained quench liquid 38 compared to a syngas cooled in a quench chamber that does not include a draft tube having the separation zone 61. For example, the second cooled syngas 66 may have between approximately 75% and approximately 99% less entrained quench liquid 38 compared to a syngas cooled in a draft tube that does not include the separation zone 61.

Following reduction of the entrained quench liquid 38 by the draft tube 52, the syngas 20 and remaining entrained water traverse from an outlet of annulus 56 to a syngas outlet 64. In some embodiments, baffles, such as an array of circumferential baffles, may be used to redirect the syngas and separate additional entrained water from the syngas 20. The second cooled syngas 66 may then exit the gasification vessel 12 via the syngas outlet 64 and may flow into a syngas treatment system 68. The syngas treatment system 68 is configured to remove residual particulates (e.g., slag, soot, unconverted carbon, etc.) from the second cooled syngas 66 and to generate treated syngas 70. For example, the syngas treatment system 68 may include a scrubber 72 that utilizes water to remove the residual particulates and other components from the second cooled syngas 66 that may have been carried over from the gasification vessel 12. The scrubber 72 may receive fluid (e.g., deaerated water) from a deaerator 74 via scrubber line 76. The fluid from the deaerator 74 may facilitate removal of the residual particulates from the second cooled syngas 66 and produce a stream of black water 80 (e.g., mixture of water and removed residual particulates). In certain embodiments, the black water 80 may be directed to a black water treatment system 81 for additional processing (e.g., recovery of unconverted carbon, disposal, etc.). In other embodiments, the black water 80 may be circulated to the gasification vessel 12. For example, as indicated by line 82, at least a portion of the black water 80 may be directed to the quench chamber 30 (e.g., the dip tube 46 via a quench ring and/or the quench bath 48) and used to cool the untreated syngas 20. In one embodiment, the black water 80 may be directed to the reactor 28, as indicated by line 85 or otherwise. The reactor 28 may gasify the unreacted carbon in the black water 80, thereby increasing the efficiency of the gasification system 10 compared to a gasification system that does not recover and gasify unconverted carbon.

In addition to the scrubber 72, the syngas treatment system 68 may also include other components, such as a shift reactor 69, a low temperature gas cooling (LTGC) train 71, and/or an acid gas removal (AGR) unit 73, to remove any other remaining undesirable impurities (e.g., diluents, $N_2$, acid gases, etc.) from the second cooled syngas 66 to generate the treated syngas 70. The treated syngas 70 may then be used for a variety of processes such as chemical processing or power generation (e.g., gas turbine, etc.). For example, the treated syngas 70 may be directed to a power production system 80 (e.g., gas turbine 84 drivingly coupled to generator 86).

The gasification system 10 may also include a controller 86 to govern operation of the gasification system 10. The controller 86 may independently control operation of the gasification system 10 by electrically communicating with sensors, control valves, and pumps or other flow adjusting features throughout the gasification system 10. The controller 86 may include a distributed control system (DCS) or any computer-based workstation that is fully or partially automated. For example, the controller 86 can be any device employing a general purpose or an application-specific processor 87, both of which may generally include memory circuitry 88 for storing instructions such as gasification parameters (e.g., the gasification conditions of the feedstock 16). The processor 87 may include one or more processing devices, and the memory circuitry 88 may include one or more tangible, non-transitory, machine-readable media collectively storing instructions executable by the processor to control actions described herein.

In one embodiment, the controller 86 may operate control devices (e.g., valves, pumps, etc.) to control amounts and/or flows between the different system components. It should be noted that there may be valves throughout the gasification system 10 used to adjust different amounts and/or flows between the system components. For example, the controller 86 may also govern operation of valves to control an amount or adjust a flow of the feedstock 16, the gasifying agent 24, and the steam 26 that enters the gasifier 14. In certain embodiments, the control device may be part of a weighing mechanism that measures the amount of the feedstock 16 before it enters the gasifier 14. Additionally, the controller 86 may adjust the amount of the quench liquid 38 supplied to the quench chamber 30 to maintain a quench vaporization level suitable for cooling the untreated syngas 20.

In certain embodiments, the controller 86 may use information provided via input signals to execute instructions or code contained on a machine-readable or computer-readable storage medium 88 and generate one or more output signals 90 to the various control devices (e.g., valves and pumps) to control a flow of fluids (e.g., the feedstock 16, gasifying agent 24, steam 26, quench liquid 38, cooled syngas 62, black water 80, treated syngas 70, or any other suitable fluid) throughout the gasification system 10.

Figure 2:
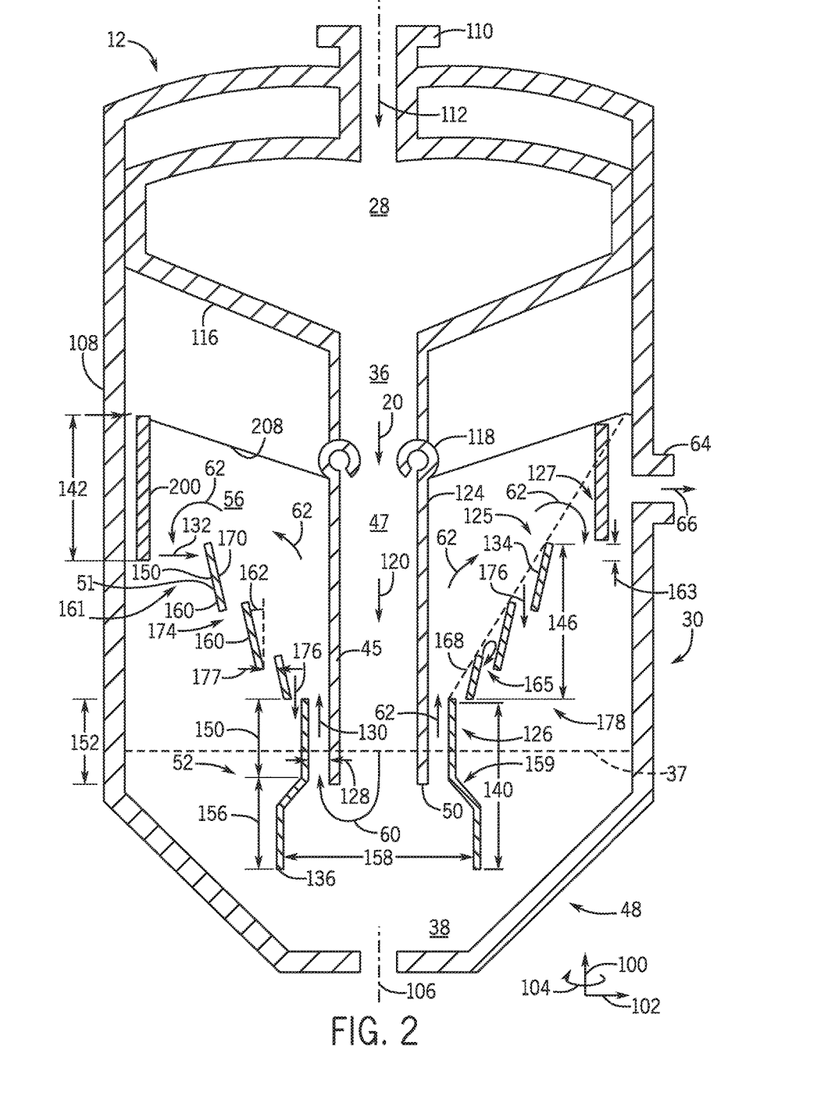
FIG. 2 is a cross-sectional view of an embodiment of the gasification vessel of FIG. 1, whereby the draft tube includes a segmented outer wall having shear plates radially and longitudinally spaced apart and oriented such that a radial dimension of the draft tube gradually increases in a flow direction of the draft tube.

As discussed above, the gasification system 10 may be configured to remove entrained liquid 38 (e.g., water) from the cooled syngas 62. For example, the quench chamber 30 may include one or more features (e.g., baffles) that facilitate removal of entrained liquid 38 from the cooled syngas 62. Turning now to FIG. 2, a cross-sectional view of an embodiment of a portion of the gasification vessel 12 is illustrated. The gasification vessel 12 may have an axial axis or direction 100, a radial axis or direction 102 away from axis 100, and a circumferential axis or direction 104 around axis 100. For example, the axis 100 corresponds to a longitudinal centerline 106 or lengthwise direction, the axis 102 corresponds to a crosswise or radial direction relative to the longitudinal centerline 106, and the axis 104 corresponds to the circumferential direction about the longitudinal centerline 106. As noted above, the gasification vessel 12 includes the reactor 28 and the quench chamber 30 in a coaxial arrangement (e.g., along axial axis 100). The gasification vessel 12 includes an enclosure 108, also referred to as a shell (e.g., an annular shell), that functions as a housing or outer casing for the gasification vessel 12 (e.g., an annular vessel). The gasification vessel 12 may also include features that facilitate coupling of the gasification vessel 12 to a source for the feedstock 16 used to generate the syngas (e.g., untreated syngas 20 and treated syngas 70). For example, the gasification vessel 12 may include an inlet 110 (e.g., an axial port at the apex of the gasification vessel 12) configured to receive an injector that supplies the gasifier 14 (e.g., reactor 28) with the feedstock 16, as indicated by arrow 112. In certain embodiments, the injector may supply the gasifier 14 with steam, gasifying agents (e.g., oxidant), or any other suitable fluid to facilitate gasification of the feedstock 16 within the gasifier 14.

The gasifier 14 may also include a protective barrier 116. As discussed above, the gasifier 14 is configured to pyrolize and partially oxidize the feedstock 16 within the reactor 28 at temperatures in excess of approximately 700° C. and pressures of at least approximately 20 bar. The protective barrier 116 may improve the durability of the gasifier 14 by decreasing temperature and pressure effects associated with gasification of the feedstock 16. Accordingly, the protective barrier 116 may define the reactor 28 and the bottom end 36. The protective barrier 116 may act as a physical barrier, a thermal barrier, a chemical barrier, or any combination thereof. Examples of materials that may be used for the protective barrier 116 include, but are not limited to, refractory materials, refractory metals, non-metallic materials, clays, ceramics, cements, and oxides of aluminum, silicon, magnesium, and calcium. In addition, the materials used for the protective barrier 116 may be bricks, castable, coatings, or any other suitable material, or combination thereof. Furthermore, in certain embodiments the protective barrier 116 may include a cooling wall or a surface wetting film for additional vessel protection. In certain embodiments, the protective barrier 116 may also coat a quench ring 118 and the dip tube 46.

As discussed above, the dip tube 46 receives the untreated syngas 20 from the reactor 28. The untreated syngas 20 is then directed by the dip tube 46 into the quench liquid as it flows in a first direction where it is cooled by contact with quench liquid 38 in quench bath 48 to generate the cooled syngas 62. Following initial contact of the untreated syngas 20 with the quench liquid 38, the cooled syngas 62 passes up through the contact zone 59 (e.g., a lower/upstream portion of the draft tube 52) or first portion of annulus 56 of the draft tube 52 that is formed between the wall 45 (e.g., an outer wall surface 124) of the dip tube 46 and the wall 51 of the draft tube 52, drawing quench liquid into the annulus 56 to enhance the contact between the cooled syngas 62 and entrained quench liquid 38 (e.g., liquid water, moisture). The contact zone 59 of the draft tube 52 includes a first inner dimension 128 (e.g., radial gap between walls 45 and 51), and the separation zone 61 includes a second inner dimension 129 (e.g., radial gap between the wall 45 and a segmented wall 126 of the draft tube 52) that increases axially 100 in a second direction 130 (e.g., upward direction) that is substantially opposite the first direction 120. For example, the second inner dimension 129 of the draft tube 52 increases toward the syngas outlet 64, such that a widest dimension 132 of the draft tube 52 is located near the syngas outlet 64. Therefore, the segmented wall 126 of the draft tube 52 has a tapered or diverging configuration (e.g., a conical wall structure or curved annular wall structure), such that the separation zone 61 of the draft tube 52 is tapered and a first tube end 134 (e.g., near the syngas outlet 64) is broader relative to a second tube end 136 (e.g., near the lower end 50) of the draft tube 52. In other words, the draft tube 52 may be described as multi-zone annular draft tube 52 having a contact zone 59 (e.g., upstream portion) between walls 45 and 51, and a separation zone 61 (e.g., downstream portion) with a segmented annular wall 126, which gradually diverge away from the wall 45 of the dip tube 46 to create a diverging annular passage or annulus 56.

Figure 3:
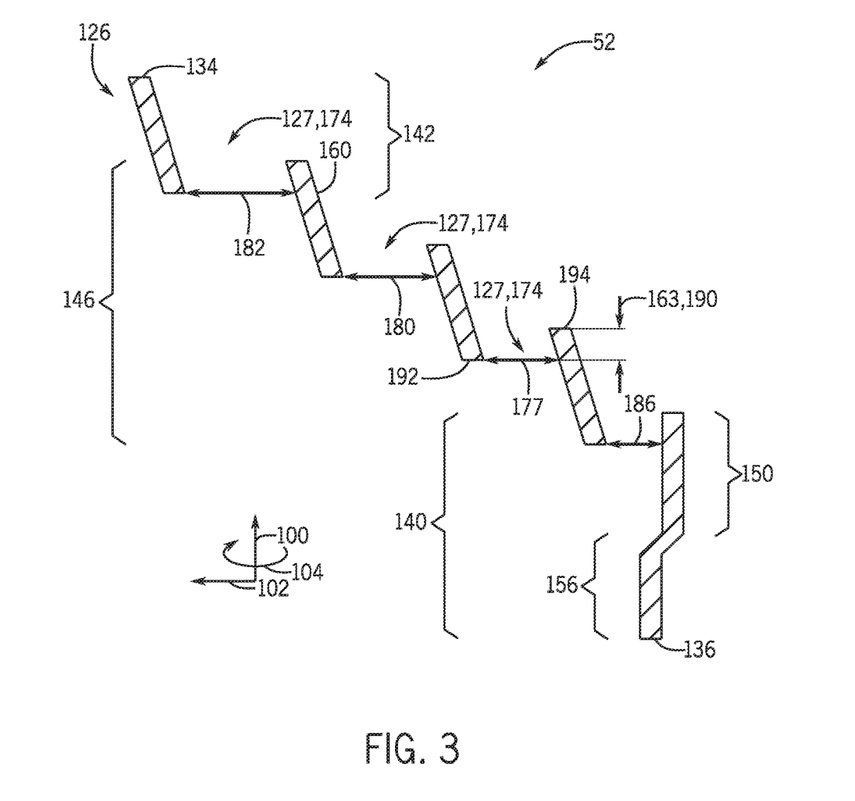
FIG. 3 is a partial cross-sectional view of an embodiment of the draft tube of FIG. 2, whereby a radial distance between each shear plate is variable.

By incorporating the tapered configuration into the draft tube 52, the separation zone 61 may have an increased flow area to allow separation of the entrained quench liquid 38 from the cooled syngas 62 within the draft tube 52 before the cool 38 may be removed through one or more radial openings (e.g., drainage openings) disposed on the segmented annular wall 126, as discussed below with reference to FIG. 3. The separated quench liquid may be increased and removal of the entrained quench liquid may be achieved. For example, the tapered configuration of the separation zone 61 may cause the cooled syngas 62 to radially 102 expand (e.g., diverge away from a central axis) to fill the annulus 56 of the draft tube 52. As the cooled syngas 62 radially expands through the annulus 56 (e.g., in the section 146), a velocity of the cooled syngas 62 decreases and a residence time of the cooled syngas 62 within the draft tube 52 may be increased. Accordingly, the drag forces applied by the cooled syngas 62 on the entrained quench liquid 38 may be decreased, thereby facilitating separation of the entrained quench liquid 38 from the cooled syngas 62 and generating the second cooled syngas 66.

In addition to having a tapered configuration, the segmented wall 126 of the draft tube 52 may also include certain features that may further enable separation of the entrained quench liquid 38 from the cooled syngas 62. For example, the segmented wall 126 of the draft tube 52 may have impinging or shearing trays 125 (e.g., wall sections or segments) and openings 127 (e.g., annular or radially oriented openings) that may further decrease a flow velocity of the cooled syngas 62 while enabling separation of entrained quench liquid 38. In the illustrated embodiment, the segmented wall 126 includes a bottom section 140 adjacent to the lower end 136 of the draft tube 52 and an impinging section 146. The impinging section 146 is positioned between a top section 142 (e.g., annular baffle) adjacent to the syngas outlet 64 and the bottom section 140. The section 146 (e.g., annular wall segments or portions) defines the tapered configuration and a first portion of the annulus 56 of the draft tube 52, and the top section (e.g., annular baffle) defines a second portion of the annulus 56 that is downstream of the draft tube 52. The bottom section 140 (extended syngas-water contact section) receives the cooled syngas 62 exiting the lower end 50 of the dip tube 46 together with quench liquid 38 from bath 48. In the illustrated embodiment, the bottom section 140 includes a first wall portion 150 extending a first distance 152 axially 100 away from the lower end 50 of the dip tube 46 and toward the first end 132 of the draft tube 52. The first distance 152 may be such that the first wall portion 150 axially 100 extends between approximately 20% and approximately 70% of the dip tube 46. The first wall portion 150 defines the first inner dimension 128 of the annulus 56, and a second wall portion 156, which includes the second end 136, defines a second inner dimension 158 of the draft tube 52. The second inner dimension 158 may be greater than the first inner diameter 128. For example, the second inner dimension 158 may be between approximately 5% and approximately 30% greater than the first inner dimension 128. In certain embodiments, a transition between the second inner dimension 158 to the more narrow first inner dimension 128 may be gradual. For example, the second inner dimension 158 may gradually decrease toward the first wall portion 150, such that the bottom section 140 has a first tapered configuration 159. However, in one embodiment, the second inner dimension 158 may be constant throughout a length of the second wall portion 156, such that the transition from the second inner dimension 158 to the first inner dimension 128 of the bottom section 140 is sudden (e.g., perpendicular). In other embodiments, there may be no transition and inner dimensions 128 and 158 are the same.

In operation, the untreated syngas 20 flows downwardly (e.g., downward first flow direction 120) through the dip tube 46, into the quench liquid 38, around the lower end 50 of the dip tube 46 as indicated by arrow 60, into the bottom section 140 of the draft tube 52, and upwardly into the annulus 56 between the dip tube 46 and the draft tube 52, while also drawing quench liquid from bath 48. In this manner, the untreated syngas 20 is cooled by and entrains at least a portion of the quench liquid 38, thereby directing the cooled syngas 62 with entrained quench liquid 38 into the bottom section 140 of the draft tube 52. Depending on the ratio (e.g., lesser than, greater than, or equal to 1) of cross-sectional flow area of the dip tube 46 relative to the cross-sectional flow area of the annulus 56 between the dip tube 46 and the draft tube 52, among other things, the flow velocity of the syngas 20, 62 may decrease, increase, or remain substantially the same as it flows from the dip tube 46 into the draft tube 52. Once inside the annulus 56, the cooled syngas 62 and entrained quench liquid 38 flow upwardly (e.g., upward second flow direction 130) between the wall 45 of the dip tube 46 and the segmented wall 51, 126 of the draft tube 52, enhancing the contact between the syngas 62 and syngas byproducts with the quench liquid 38.

In certain embodiments, at least approximately 75% to 95% of the entrained quench liquid 38 may be removed downstream of the bottom section 140, for example, in the impinging section 146. The impinging section 146 defines a portion of a second tapered configuration 161 that broadens (e.g., expands or diverges) in the second direction 130. The broadening of the second tapered configuration 161 of the draft tube 52 may decrease the flow velocity of the cooled syngas 62 as the cooled syngas 62 flows in the upward second direction 130. For example, the second tapered configuration 161 increases a flow area of the cooled syngas 62 through the annulus 56 of the draft tube 52. Therefore, as the cooled syngas 62 radially 102 expands to fill the flow area defined by the second tapered configuration 161, the flow velocity of the cooled syngas 62 and the drag forces acting on the entrained quench liquid 38 by the syngas decrease and may allow removal of the quench liquid 38 entrained within the cooled syngas 62 to generate the second cooled syngas 66. In the illustrated embodiment, the impinging section 146 is defined by a plurality of shear plates 160 (e.g., annular shear plates or trays 127) that are spaced axially 100 and radially 102 apart and define a portion of the segmented wall 126. In some embodiments, each pair of adjacent shear plates of the plurality of shear plates 160 may be at least partially overlapping or staggered in the axial direction 100, as indicated by axial overlap 163 between adjacent shear plates 160. In addition, each shear plate of the plurality of shear plates 160 may be oriented at a first acute angle 162 relative to the centerline axis 106. The combination of spacing, axial overlaps 163, and acute angles 162 of the plurality of shear plates 160 increases the surface area for impingement, increases the volume of the annulus 56, and creates recirculation zones 165 (e.g., low velocity zones where the flow of entrained quench liquid 38 may reverse), each contributing to greater separation of the entrained quench liquid 38 from the cooled syngas 62.

The first acute angle 162 may be the same or different (e.g., increasing or decreasing in the direction 130) from one shear plate to another in the plurality of shear plates 160. The first acute angle 162 may be equal to, less than, or greater than approximately 5, 10, 15, 20, 25, 30, 35, 40, 45, 50, 55, 60, 65, 70, or 75 degrees. In certain embodiments, the first acute angle 162 may be approximately 1 to 60, 1 to 45, 1 to 30, or 5 to 15 degrees. Because each shear plate of the plurality of shear plates 160 is radially 102 spaced apart from an adjacent shear plate of the plurality of shear plates 160 and oriented at the first acute angle 162, the second tapered configuration 161 gradually increases from the bottom of section 142 to the top of section 142. For example, the impinging section 146 may have a taper angle 168 relative to the centerline 106. The taper angle 168 may be constant or variable (e.g., increasing or decreasing in the direction 130) from the bottom section 140 to the top section 142. For example, the taper angle 168 may be equal to, less than, or greater than approximately 5, 10, 15, 20, 25, 30, 35, 40, 45, 50, 55, 60, 65, 70, or 75 degrees. In certain embodiments, the taper angle 168 may be approximately 1 to 60, 1 to 45, 1 to 30, or 5 to 15 degrees. By arranging each shear plate of the plurality of shear plates 160 that coincide with the segmented wall 126 (e.g., an annular wall) of the draft tube 52 to form the second tapered configuration 161, the draft tube 52 may have an increased flow area downstream of the bottom section 140. Accordingly, as discussed above, the cooled syngas 62 radially 102 expands (e.g., diverges or diffuses) to fill the area defined by the impinging section 146 as the cooled syngas 62 flows from the bottom section 140 to the impinging section 146 in the second flow direction 130.

Expansion of the cooled syngas 62 within the impinging section 146 may decrease the flow velocity of the cooled syngas 62 and, consequently, the drag forces acting on the quench liquid 38 entrained in the cooled syngas 62. For example, the drag forces acting on the quench liquid 38 (e.g., due to the flow velocity of the cooled syngas 62 flowing in the upward second flow direction 130 through the draft tube 52) may lead to entrainment of the quench liquid 38 in the cooled syngas 62. The drag force acting on the quench liquid 38 is proportional to the square of the gas velocity of the cooled syngas 62. Therefore, the greater the flow velocity of the cooled syngas 62 impinging on the quench liquid 38 and flowing through the annulus 56 of the draft tube 52, the greater the amount of quench liquid 38 is entrained in the cooled syngas 62. Accordingly, decreasing the flow velocity of the cooled syngas 62 within the draft tube 52 may also decrease the drag forces acting on the quench liquid 38 as the cooled syngas 62 flows through the draft tube 52. Consequently, entrainment of the quench liquid 38 may be reduced in the draft tube 52 having the tapered configuration 161, as compared to draft tubes that do not include a tapered configuration. The decrease in the drag forces due to the cooled syngas 62 acting on the entrained quench liquid 38 may facilitate removal of the entrained quench liquid 38 from the cooled syngas 62 to generate the second cooled syngas 66 having a reduced percentage of entrained quench liquid 38. For example, the second cooled syngas 66 may have a reduced content of the entrained quench liquid 38, e.g., less than approximately 5, 10, 15, 20, or 25 percent. By further example, the second cooled syngas 66 may be substantially free of entrained quench liquid 38 (e.g., less than approximately 1, 2, 3, 4, or 5 percent).

In addition to increasing the flow area of the impinging section 146 to decrease the flow velocity of the cooled syngas 62, each shear plate of the plurality of shear plates 160 includes plate impinging inner surfaces 170 that may produce shear on the entrained quench liquid 38. Again, the combination of spacing, axial overlaps 163, and acute angles 162 of the plurality of shear plates 160 increases the surface area for impingement (e.g., surfaces 170), increases the volume of the annulus 56, and creates recirculation zones 165 (e.g., low velocity zones where the flow reverses and quench liquid may pool), each contributing to greater separation of the entrained quench liquid 38 from the cooled syngas 62. For example, as the cooled syngas 62 radially 102 expands to fill the flow area in the impinging section 146, the flow velocity of the cooled syngas 62 may decrease, thereby causing the cooled syngas 62 to release the entrained quench liquid 38 (e.g., the liquid 38 is no longer able to be carried with the cooled syngas 62 due to the decrease in the flow velocity of the cooled syngas 62). That is, due to the reduction of the drag forces acting on the entrained quench liquid 38 by the cooled syngas 62, which may not be sufficient to carry the entrained quench liquid through the draft tube 52 in the upward second flow direction 130 and toward the syngas outlet 64. Therefore, the entrained quench liquid 38 mixed with the cooled syngas 62 is sheared (e.g., shed, released), thereby generating the second cooled syngas 66 and a sheared quench liquid 176.

The impinging section 146 includes a plurality of openings 174 axially 100 and radially 102 spaced apart along the segmented wall 126 of the draft tube 52. For example, each opening of the plurality of openings 174 may be radially 102 spaced apart from an adjacent opening of the plurality of openings 127, 174 by a first radial dimension 177. Additionally, each shear plate of the plurality of shear plates 160 is axially 100 spaced apart from an adjacent shear plate of the plurality of shear plates 160. The axial 100 and radial 102 spacing between each pair of adjacent shear plates of the plurality of shear plates generates a gap (e.g., an annular opening) between each pair of adjacent shear plates of the plurality of shear plates 160 that corresponds to each opening of the plurality of openings 127, 174. The plurality of openings 174 may allow the sheared quench liquid 176 to exit the annulus 56 of the draft tube 52 and flow into quench bath 48 of the quench chamber 30. A size of each opening of the plurality of openings 174 is equal to the first radial dimension 177, which is sized to allow flow of the sheared quench liquid 176, and any associated solid gasification byproducts (e.g., slag, unreacted carbon particles, etc.) without occluding (e.g., clogging) the plurality of openings 174.

Additionally, the plurality of openings 174 may allow at least a portion (e.g., between approximately 5 percent and 25 percent) of the cooled syngas 62 to flow into an annular space 178 of the quench chamber 30. The annular space 178 is positioned between the segmented wall 126 of the draft tube 52 and the enclosure 108 (e.g., an inner annular wall of the enclosure 108). The annular space 178 circumferentially 104 surrounds the draft tube 52. The cooled syngas 62 may flow through the plurality of openings 174 and into the annular space 178, where it may further radially 102 expand to fill the annular space 178 before exiting the gasification vessel 12 (e.g., through the syngas outlet 64). The radial expansion of the cooled syngas 62 may further reduce the flow velocity of the cooled syngas 62 and the drag forces acting on the entrained quench liquid 38 remaining in the cooled syngas 62. Accordingly, the cooled syngas 62 may continue to shed the entrained quench liquid 38 to generate the second cooled syngas 66 with a reduced content of entrained quench liquid 38 as discussed above.

As discussed above, each shear plate of the plurality of shear plates 160 is axially 100 and radially 102 spaced apart from an adjacent shear plate of the plurality of shear plates 160. In certain embodiments, the spacing (e.g., the first radial dimension 177) between each pair of adjacent shear plates of the plurality of shear plates 160 is the same. In other embodiments, the spacing between each pair of adjacent shear plates of the plurality of shear plates 160 is different. For example, FIG. 3 illustrates an embodiment of a portion of the segmented wall 126 of the draft tube 52 in which the radial spacing between each pair of adjacent shear plates of the plurality of shear plates 160 is variable. In the illustrated embodiment, the first radial dimension 177 progressively increases between each pair of adjacent shear plates of the plurality of shear plates 160 in the radial direction 102 that is away from the dip tube 46, as shown by second and third radial dimensions 180, 182, respectively. For example, the radial dimensions 180, 182 may be between approximately 0.5 percent and 75 percent, or more, greater than the first radial dimension 177. In some embodiments, the radial dimensions 177, 180 may be less than approximately 5, 10, 15, 20, 25, 30, 40, 50, 60, or 70 percent of the radial dimension 182. However, in certain embodiments, the second radial dimension 180 may be greater than both radial dimension 177, 182. That is, the radial dimensions 177, 180, 182 may alternate between increasing and decreasing radial dimensions in the axial direction 100 that is toward the top section 142. By way of example, the radial dimensions 177, 182 may be between approximately 5 percent and approximately 25 percent greater than the second radial dimension 180.

In addition to the radial dimensions 177, 180, 182 positioned between each pair of adjacent shear plates of the plurality of shear plates 160, the draft tube 52 also includes a fourth radial dimension 186 between the bottom section 140 and the impinging section 146 (e.g., between the first wall portion 160 and an adjacent shear plate of the plurality of shear plates 160). The fourth radial dimension 186 may be less than or equal to the radial dimensions 177, 180, 182. For example, the fourth radial dimension 186 may be between approximately 0.5 percent and approximately 75 percent less than or equal to the radial dimensions 177, 180, 182. In some embodiments, the radial dimensions 186 may be less than approximately 5, 10, 15, 20, 25, 30, 40, 50, 60, or 70 percent of the radial dimension 177, 180, 182. However, in certain embodiments, the fourth radial dimension 186 is greater than the radial dimensions 177, 180, 182.

Similar to the radial dimensions 177, 180, 182, 186, an axial dimension 190 between each pair of adjacent shear plates of the plurality of shear plates 160 may be the same or variable. In the illustrated embodiment, the axial dimension 190 is the same between each pair of adjacent shear plates of the plurality of shear plates 160. Additionally, each shear plate of the plurality of shear plates 160 is axially positioned such that a first plate end 192 of one shear plate of the plurality of shear plates 160 is below a second plate end 194 of an adjacent shear plate of the plurality of shear plates 160. That is, in this particular configuration, the plurality of shear plates 160 are arranged such that there is not an axial 100 gap between the ends 192, 194 of the respective shear plate of the plurality of shear plates 160. For example, the plurality of shear plates 160 may be positioned in a staggered configuration along the axial dimension 100, such that a partial overlap 163 is created between ends 192, 194 of the plurality of shear plates 160. The absence of an axial gap (e.g., overlap 163) between each shear plate of the plurality of shear plates 160 may facilitate removal of the entrained quench liquid 38 from the cooled syngas 62 by reversing the flow direction of the entrained quench liquid 38 from the second direction 130 to the first direction 120 to direct a portion of the entrained quench liquid 38 into the annular space 178. While in the annular space 178, the flow direction of the cooled syngas 62 may once again change from the first direction 120 to the second direction 130 and may continue to radially expand to fill the annular space 178. As such, the flow velocity of the cooled syngas 62 in the annular space 178 may continue to decrease and allow shedding of additional entrained quench liquid 38 to generate the second cooled syngas 66. In certain embodiments, the plurality of shear plates 160 are arranged such that an axial gap is present between the ends 192, 194 of adjacent pairs of shear plates of the plurality of shear plates 160. In this particular embodiment, the cooled syngas 62 may continue to radially expand into the annular space 178, thereby decreasing the flow velocity of the cooled syngas 62 and facilitating removal of the entrained quench liquid 38, as discussed above.

Figure 4:
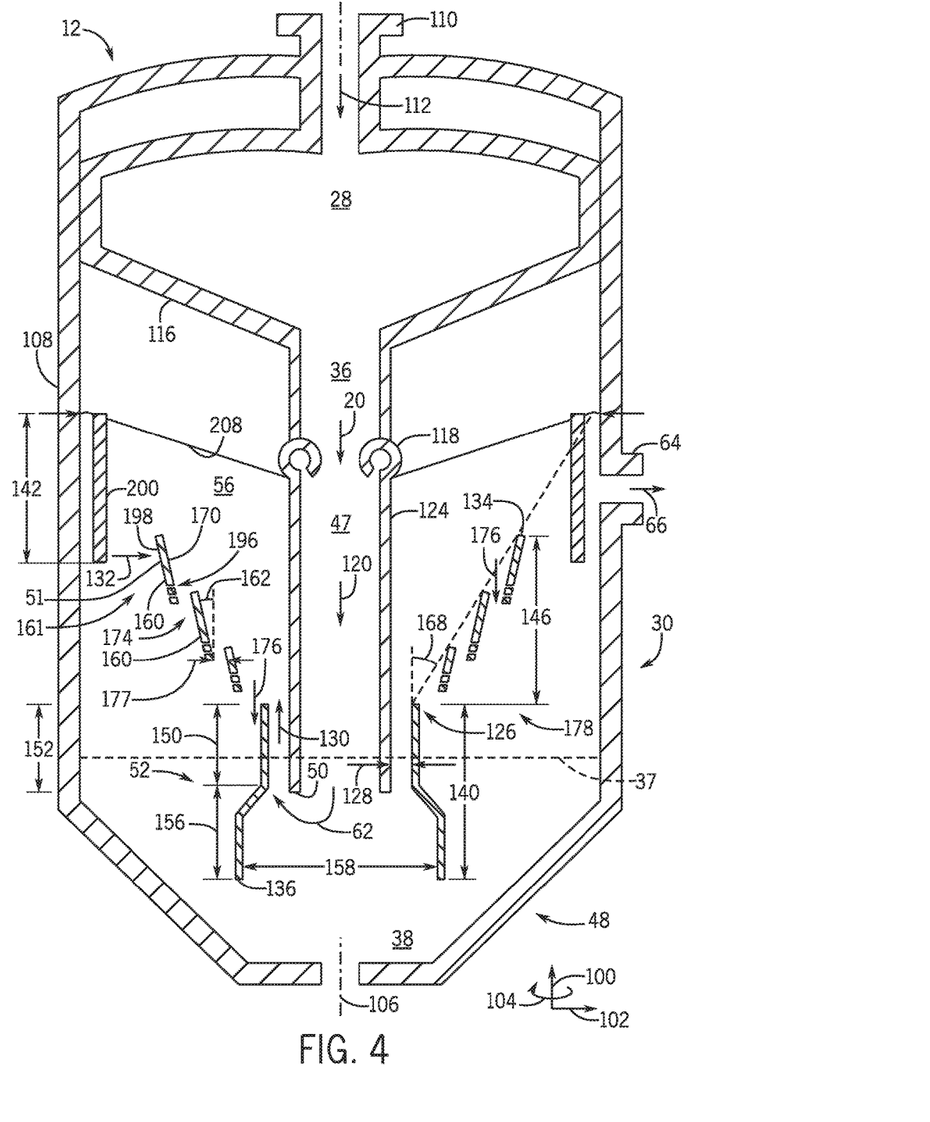
FIG. 4 is a cross-sectional view of an embodiment of the gasification vessel of FIG. 1, whereby the shear plates include one or more perforations.

In certain embodiments, each shear plate of the plurality of shear plates 160 may include one or more perforations axially and circumferentially spaced apart along a wall of the plurality of shear plates 160. For example, FIG. 4 illustrates an embodiment of the gasification vessel 12 having one or more perforations 196 disposed along at least a portion of a wall 198 of the plurality of shear plates 160. As illustrated, each perforation of the one or more perforations is axially 100 and circumferentially 104 spaced apart from an adjacent perforation of the one or more perforations 160. The one or more openings 196 may direct the flow of the cooled syngas 62, 66 into the annular space 178, where the cooled syngas 62 may continue to radially expand and shed the entrained quench liquid 38, as discussed above. While in the illustrated embodiment, each shear plate of the plurality of shear plates 160 includes the one or more perforations 196, in certain embodiments, only a portion (e.g., limited number) of the plurality of shear plates 160 include the one or more perforations 196. For example, the draft tube 52 may include a first portion (e.g., a first number) of shear plates of the plurality of shear plates 160 that include the one or more perforations 196 and a second portion (e.g., a second number) of shear plates of the plurality of shear plates 160 that do not include the one or more perforations 196.

As illustrated in FIGS. 2 and 4, in certain embodiments, at least a portion of the cooled syngas 62 flowing through the annulus 56 of the draft tube 52 may continue to flow in the second direction 130 (e.g., upward direction) toward the top section 142. As such, the cooled syngas 62 may continue to expand radially 102 to fill the annulus 56 between the dip tube 46 and the top section 142 of the draft tube 52. As the portion of the cooled syngas 62 flows into the top section 142, the portion of the cooled syngas 62 may impinge on the second inner wall surface 200, a top inner surface 208 (e.g., annular top surface) of the quench chamber 30, or both, which may continue to decrease the flow velocity of the cooled syngas 62 and facilitate removal of the entrained quench liquid 38 to generated the second cooled syngas 66. For example, impingement of the cooled syngas 62 against the second inner wall surface 200 and/or the top inner surface 208 may change the flow direction of the cooled syngas 62 from the second flow direction 130 (e.g., upward direction) to the first direction 120 (e.g., downward direction) to direct the flow of the cooled syngas 62 to the annular space 178 through one of the plurality of openings 174. The cooled syngas 62 may continue to shed residual entrained quench liquid 38 that was not removed in the impinging section 146 before exiting the gasification vessel 12 via the syngas outlet 30.

Figure 5:
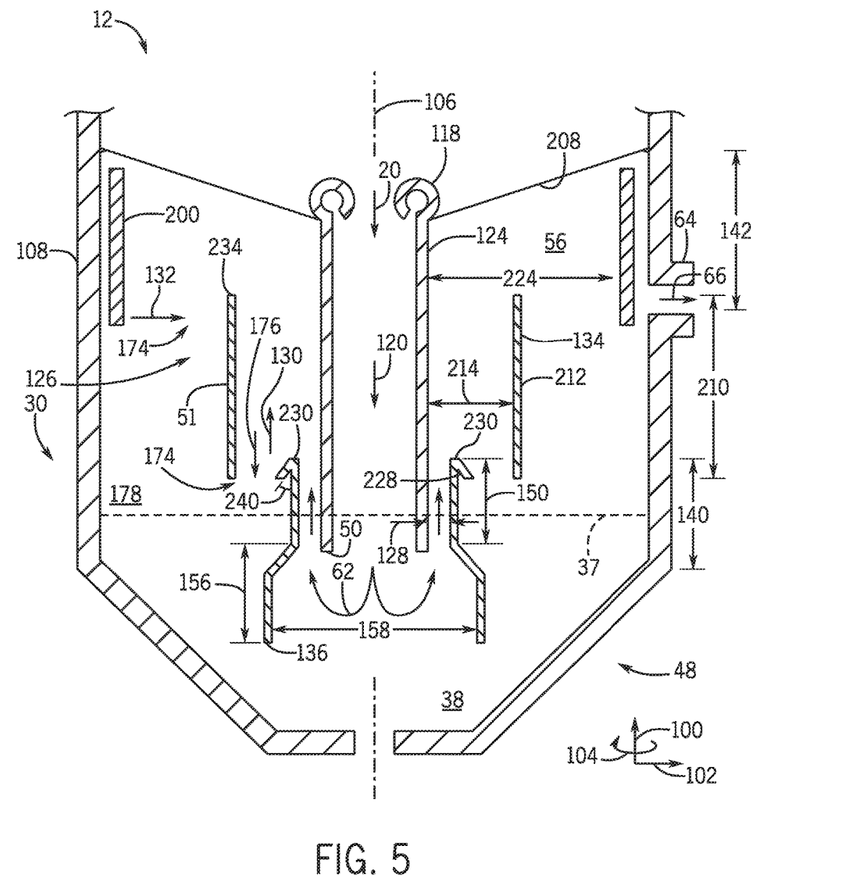
FIG. 5 is a cross-sectional view of an embodiment of the gasification vessel of FIG. 1, whereby the draft tube includes a middle section having a baffle defining at least a portion of a draft tube wall and radially spaced apart from a bottom section of the draft tube such that the draft tube has a step-like tapered configuration.

As discussed above, the draft tube 52 may have a tapered configuration that facilitates removal of the entrained quench liquid 38 in the cooled syngas 62 by decreasing the flow velocity of the cooled syngas 62 through the draft tube 52, which also decreases the drag forces acting on the entrained quench liquid 38. FIG. 5 illustrates an alternative embodiment of the draft tube 52 in which broadening of the draft tube 52 to form the second tapered configuration 161 is stepped (e.g., sudden), rather than gradual (e.g., FIGS. 2 and 4). For example, in the illustrated embodiment, the daft tube 52 includes a middle section 210 having a quench exit baffle 212 (e.g., annular baffle) disposed between the bottom section 145 and the top section 142, such that the sections 140, 210, and 142 collectively define the segmented wall 126. The quench exit baffle 212 is radially 102 spaced away from the dip tube 46 by a fifth radial dimension 214 that is greater than the first inner dimension 128 positioned between the dip tube 46 and the first wall portion 150. The quench exit baffle 212 extends axially 100 and is circumferentially 104 about at least a portion of the dip tube 46. The quench exit baffle 212 may be oriented parallel to the centerline axis 106 of the gasification vessel 12, such that a transition between the first inner dimension 128 and the fifth radial dimension 214 is stepped or sudden. Similarly, a transition between the fifth radial dimension 214 and a sixth radial dimension 224 (e.g., interface between the middle section 210 and the top section 142) is stepped.

The stepped increase between the dimensions 128, 214, 224 results in a sudden broadening of the draft tube 52 in the second flow direction 130, which allows the flow velocity of the cooled syngas 62 to decrease as it radially 102 expands to fill the annulus 56 in the sections 142, 210. As discussed above, the decrease in the flow velocity of the cooled syngas 62 resulting from radial expansion also decreases the drag forces of the cooled syngas 62 acting on the entrained quench liquid 38. Therefore, the entrained quench liquid 38 may be separated from the cooled syngas 62 to generate the second cooled syngas 66 and the sheared quench liquid 176. The sheared quench liquid 176 may flow into quench bath 48 through the openings 174.

Figure 6:
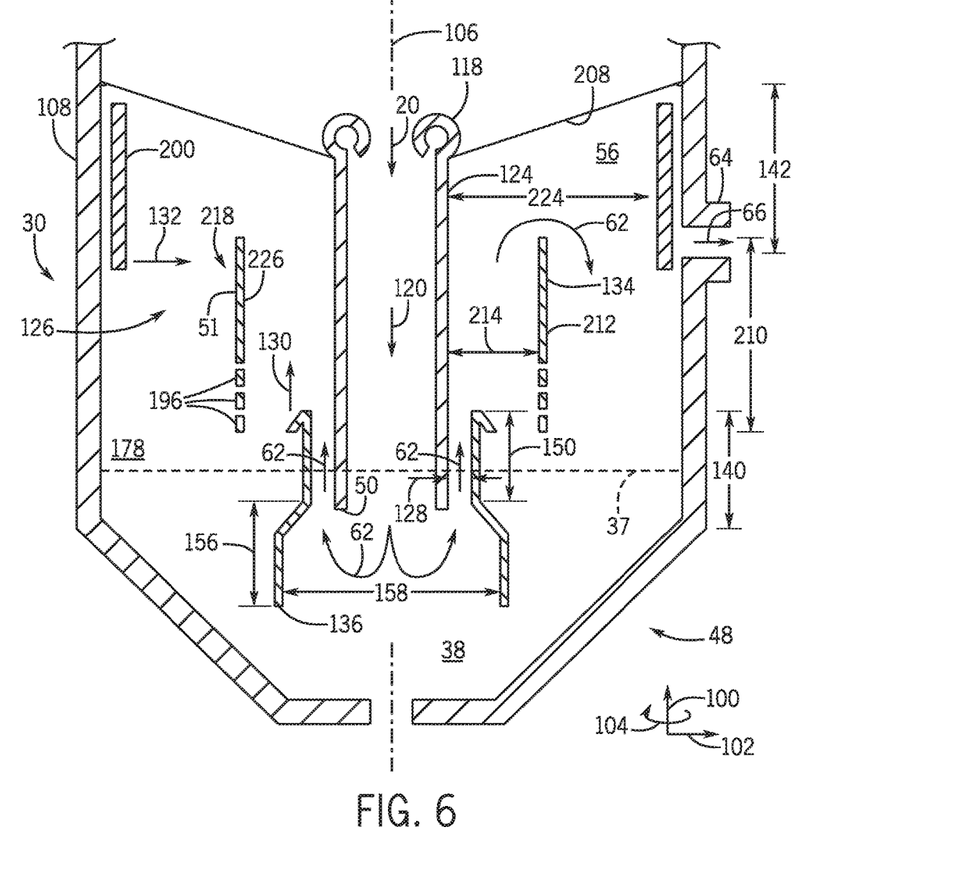
FIG. 6 is a cross-sectional view of an embodiment of the gasification vessel of FIG. 5, whereby a portion of the baffle includes one or more perforations.

Similar to the plurality of shear plates 160 illustrated in FIG. 4, the quench exit baffle 212 may include the one or more perforations 196, as shown in FIG. 6. The one or more perforations 196 are radially 102 and circumferentially 104 spaced apart along a baffle wall 226. As discussed above, the one or more perforations 196 direct the cooled syngas 62 into the annular space 178. Therefore, the cooled syngas 62 may continue to radially expand 102 as it fills the annular space 178, thereby further decreasing the flow velocity of the cooled syngas 62, facilitating removal of the entrained quench liquid 38, and generating the second cooled syngas 66. The one or more perforations 196 are sized such that occlusion (e.g., clogging) by particulates such as char, unreacted carbon, slag, that may be entrained in the cooled syngas 62, 66 is mitigated.

In certain embodiments, a drain 228 (e.g., tapered annular drain wall) may be positioned adjacent to a first terminating end 230 of the first wall portion 150. The drain 228 may collect and drain the sheared quench liquid 176 as the velocity of the cooled syngas 62 decreases. The drain 228 radially 102 extends away from the first terminating end 230 in a direction away from the dip tube 46. Additionally, the drain 228 may be oriented at an acute angle 240 relative to the longitudinal axis 100 of the first wall portion 150. In this way, the drain 228 may collect and guide the sheared quench liquid 176 into quench bath 48. Since a large percentage (e.g., approximately 75 percent and approximately 95 percent) of the entrained quench liquid may be removed in the middle section 210, positioning the drain adjacent to the first terminating end 230 may mitigate re-entrainment of the sheared quench liquid 176 by the cooled syngas 62 entering the middle section 210. While in the illustrated embodiment, the drain 228 is positioned adjacent to the first terminating end 230, in other embodiments, the drain 228 may be positioned adjacent to a second terminating end 234 of the quench exit baffle 212 or adjacent to both terminating ends 230, 234.

As described above, certain embodiments of the gasification system 10 may include a tapered draft tube (e.g., the draft tube 52) circumferentially surrounding the dip tube 46 in the quench chamber 30. The tapered configuration of the draft tube 52 may decrease the velocity of the cooled syngas 62, and thereby facilitate removal of the entrained quench liquid 38 by reducing the drag forces acting on the entrained quench liquid 38 by the cooled syngas 62. Additionally, the tapered configuration of the draft tube 52 may increase a residence time of the cooled syngas 62, which may also facilitate removal of the entrained quench liquid 38 to generate the second cooled syngas 66. In this way the second cooled syngas 66 may be substantially free of entrained quench liquid 38. The plurality of openings 174 along the draft tube 52 may direct the sheared quench liquid 176 into quench bath 48, where it may be reused to cool the syngas 20 in the quench chamber 30.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system, comprising:
   a quench system configured to cool a syngas generated in a gasification chamber, wherein the quench system comprises:
   a quench chamber;
   a dip tube fluidly configured to direct the syngas from the gasification chamber into a quench liquid to cool the syngas to generate a cooled syngas; and
   a draft tube disposed circumferentially about the dip tube and configured to receive the cooled syngas, wherein a passage is disposed between a first wall of the dip tube and a second wall of the draft tube, and the draft tube comprises a tapered configuration in a flow direction along the passage,
   wherein the second wall comprises a plurality of segments, and each segment of the plurality of segments is radially offset and at least partially axially offset from an adjacent segment of the plurality of segments, and wherein at least one opening is positioned between each pair of adjacent segments of the plurality of segments.

2. The system of claim 1, wherein at least a portion of the second wall is oriented at an acute angle relative to a centerline axis of the draft tube to define the tapered configuration such that a radial dimension of the passage gradually increases in the flow direction.

3. The system of claim 1, wherein the radially offset plurality of segments defines the tapered configuration.

4. The system of claim 3, wherein the at least one opening is fluidly coupled to a chamber that circumferentially surrounds the draft tube and that is fluidly coupled to a syngas outlet.

5. The system of claim 4, comprising a drain radially extending away from at least one segment of the plurality of segments and toward the opening, wherein the drain is oriented at an angle relative to a centerline axis of the draft tube and configured to direct a flow of fluid from the passage to the chamber.

6. The system of claim 3, wherein at least one segment of the plurality of segments is oriented at an angle relative to a centerline axis of the draft tube.

7. The system of claim 3, wherein at least one segment of the plurality of segments is oriented parallel relative to a centerline axis of the draft tube.

8. The system of claim 3, wherein a radial distance between adjacent segments is variable from one pair of adjacent segments to at least one other pair of adjacent segments of the plurality of segments.

9. The system of claim 3, wherein a radial distance between adjacent segments is constant from one pair of adjacent segments to at least one other pair of adjacent segments of the plurality of segments.

10. The system of claim 3, wherein at least one segment of the second wall comprises a plurality of perforations.

11. The system of claim 1, comprising a gasifier having a housing, the gasification chamber disposed in the housing, and the quench system disposed in the housing downstream of the gasification chamber.

12. A system, comprising
   a draft tube configured to mount about a dip tube in a quench system of a gasifier downstream from a gasification chamber, wherein the draft tube comprises
   a plurality of segments arranged in a tapered configuration, and each segment of the plurality of segments is radially offset and at least partially axially offset from an adjacent segment of the plurality of segments, and wherein at least one opening is positioned between each pair of adjacent segments of the plurality of segments.

13. The system of claim 12, wherein the radially offset plurality of segments defines the tapered configuration.

14. The system of claim 12, wherein a portion of at least one segment of the plurality of segments is oriented at an acute angle relative to a centerline axis of the draft tube.

15. The system of claim 12, wherein a portion of at least one segment of the plurality of segments is oriented parallel relative to a centerline axis of the draft tube.

16. The system of claim 12, wherein at least one segment of the plurality of segments comprises a plurality of perforations.

17. The system of claim 12, comprising the quench system having the draft tube disposed at least partially about the dip tube.

18. The system of claim 17, comprising a gasifier having a housing, the gasification chamber disposed in the housing, and the quench system disposed in the housing downstream of the gasification chamber.

19. A method, comprising:
   routing a syngas from a gasification chamber, through a dip tube, and into a quench liquid to cool the syngas to generate a cooled syngas; and
   routing the cooled syngas through a passage between the dip tube and a draft tube disposed circumferentially about the dip tube, wherein the draft tube comprises a tapered configuration in a flow direction along the passage
   and a plurality of segments, each segment of the plurality of segments is radially offset and at least partially axially offset from an adjacent segment of the plurality of segments, and wherein at least one opening is positioned between each pair of adjacent segments of the plurality of segments.

* * * * *